(12) United States Patent
Hermes et al.

(10) Patent No.: US 11,980,217 B2
(45) Date of Patent: May 14, 2024

(54) EXTRUDED CORN PROTEIN MATERIAL (71) Applicant: CARGILL, INCORPORATED, Wayzata, MN (US)

(72) Inventors: Tasha Joy Hermes, Maple Grove, MN (US); Michael A. Porter, Maple Grove, MN (US); Chad Rieschl, Brooklyn Park, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 65 days.

(21) Appl. No.: 16/635,673

(22) PCT Filed: Aug. 2, 2018

(86) PCT No.: PCT/US2018/045029
§ 371 (c)(1),
(2) Date: Jan. 31, 2020

(87) PCT Pub. No.: WO2019/028263
PCT Pub. Date: Feb. 7, 2019

(65) Prior Publication Data
US 2021/0120851 A1    Apr. 29, 2021

Related U.S. Application Data (60) Provisional application No. 62/540,107, filed on Aug. 2, 2017.

(51) Int. Cl.
*A23L 7/17*    (2016.01)
*A23J 1/12*    (2006.01)

(52) U.S. Cl.
CPC .. *A23L 7/17* (2016.08); *A23J 1/12* (2013.01)

(58) Field of Classification Search
CPC .............. A23J 1/12; A23L 7/17; A23L 33/185
USPC ......................................................... 426/549
See application file for complete search history.

(56) References Cited

U.S. PATENT DOCUMENTS

| | | | |
|---|---|---|---|
| 2,105,760 A | 1/1938 | Swallen |
| 2,120,946 A | 6/1938 | Swallen |
| 2,124,284 A | 7/1938 | Hans |
| 2,133,591 A | 10/1938 | Swallen |
| 2,156,928 A | 5/1939 | Swallen |
| 2,218,221 A | 10/1940 | Schopmeyer |
| 2,227,605 A | 1/1941 | Swallen |
| 2,360,381 A | 10/1944 | Walsh |
| 2,384,388 A | 9/1945 | Monte |

(Continued)

FOREIGN PATENT DOCUMENTS

| CN | 1899076 A | 1/2007 |
|---|---|---|
| CN | 101703146 A | 5/2010 |

(Continued)

OTHER PUBLICATIONS

"The Corn Refining Process" 2 pages, downloaded from https://com.org/wp-contentiuploads/2009/11/CornRefiningProcess.pdf (Year: 2009).

(Continued)

*Primary Examiner* — Subbalakshmi Prakash (57) ABSTRACT

Described herein is a food product and methods of manufacturing the same, comprising a corn protein isolate or corn protein concentrate and a polysaccharide; wherein the food product has a density ranging from about 40 g/L to about 350 g/L.

5 Claims, 1 Drawing Sheet

(56) References Cited

U.S. PATENT DOCUMENTS

| | | |
|---|---|---|
| 2,414,195 A | 1/1947 | Evans |
| 2,704,257 A | 3/1955 | Sollano |
| 4,018,936 A | 4/1977 | Garbutt |
| 4,024,120 A | 5/1977 | Phillips |
| 4,108,847 A | 8/1978 | Creinin |
| 4,213,941 A | 7/1980 | Boomer |
| 4,265,925 A | 5/1981 | Campbell |
| 4,361,651 A | 11/1982 | Keim |
| 4,624,805 A | 11/1986 | Lawhon |
| 4,716,218 A | 12/1987 | Chen |
| 5,254,673 A | 10/1993 | Cook |
| 5,254,763 A | 10/1993 | Gill |
| 5,367,055 A | 11/1994 | Takahashi |
| 5,410,021 A | 4/1995 | Kampen |
| 5,498,431 A | 3/1996 | Lindner |
| 5,510,463 A | 4/1996 | Takahashi |
| 5,580,959 A | 12/1996 | Cook |
| 5,602,286 A | 2/1997 | Muralidhara |
| 5,798,446 A | 8/1998 | Neumuller |
| 5,847,238 A | 12/1998 | Muralidhara |
| 6,169,217 B1 | 1/2001 | Cheryan |
| 6,433,146 B1 | 8/2002 | Cheryan |
| 6,602,985 B1 | 8/2003 | McInnis |
| 6,610,831 B1 | 8/2003 | McInnis |
| 6,846,909 B2 | 1/2005 | Mairal |
| 7,045,607 B2 | 5/2006 | Cheryan |
| 7,829,680 B1 | 11/2010 | Sander |
| 8,795,760 B2 | 8/2014 | Lawton, Jr. |
| 9,226,515 B2 | 1/2016 | Slabbekoorn |
| 2001/0009040 A1 | 7/2001 | Duvick |
| 2002/0183490 A1 | 12/2002 | Cheryan |
| 2003/0066106 A1 | 4/2003 | Strissel |
| 2003/0198725 A1 | 10/2003 | Cardenas |
| 2004/0009263 A1 | 1/2004 | Liu |
| 2005/0008759 A1 | 1/2005 | Nie |
| 2005/0064079 A1 | 3/2005 | Allen |
| 2005/0074538 A1 | 4/2005 | Elder |
| 2006/0057275 A1 | 3/2006 | Wu |
| 2006/0182857 A1 | 8/2006 | Thorre |
| 2006/0240169 A1 | 10/2006 | Heydtmann |
| 2007/0087101 A1 | 4/2007 | Gusek |
| 2007/0172914 A1 | 7/2007 | Slabbekoorn |
| 2008/0102502 A1 | 5/2008 | Foody |
| 2008/0118626 A1 | 5/2008 | McWilliams |
| 2009/0041901 A1 | 2/2009 | Elmusa |
| 2009/0053368 A1 | 2/2009 | Fox |
| 2009/0148589 A1* | 6/2009 | Fox .................. A23K 20/158 426/648 |
| 2009/0209423 A1 | 8/2009 | Slabbekoorn |
| 2009/0215990 A1 | 8/2009 | Cheryan |
| 2010/0016554 A1 | 1/2010 | Cheryan |
| 2010/0159521 A1 | 6/2010 | Cirakovic |
| 2010/0221387 A1 | 9/2010 | Cristianini |
| 2010/0233756 A1* | 9/2010 | Sunvold ............... A23K 20/20 435/34 |
| 2012/0027890 A1 | 2/2012 | Cerne |
| 2013/0273219 A1* | 10/2013 | Baier .................. A23L 7/161 426/242 |
| 2014/0123855 A1 | 5/2014 | Lawton, Jr. |
| 2014/0161962 A1 | 6/2014 | Boebel |
| 2014/0193547 A1 | 7/2014 | Brown |
| 2014/0220217 A1 | 8/2014 | Brown |
| 2014/0271928 A1 | 9/2014 | Rehage |
| 2014/0303348 A1 | 10/2014 | Lawton, Jr. |
| 2014/0343259 A1 | 11/2014 | Bleyer |
| 2014/0356510 A1 | 12/2014 | Schweizer |
| 2015/0201647 A1* | 7/2015 | Fosdick ................ A23J 1/12 426/549 |
| 2016/0165932 A1 | 6/2016 | Armentrout |
| 2016/0286840 A1 | 10/2016 | Shane |
| 2017/0354737 A1 | 12/2017 | Harel |
| 2019/0029295 A1 | 1/2019 | Mielgo Iza |
| 2020/0236977 A1 | 7/2020 | Li |

FOREIGN PATENT DOCUMENTS

| | | | |
|---|---|---|---|
| CN | 102037134 A | 4/2011 | |
| CN | 101560252 B | 1/2012 | |
| CN | 102669406 A | 9/2012 | |
| CN | 103059116 A | 4/2013 | |
| CN | 103554278 A | 2/2014 | |
| CN | 104938763 A | 9/2015 | |
| CN | 105541982 A | 5/2016 | |
| CN | 106009766 B | 11/2017 | |
| EP | 0510537 B1 | 7/1997 | |
| EP | 0648078 B1 | 4/2001 | |
| EP | 2491794 A1 | 8/2012 | |
| EP | 2401920 B1 | 2/2013 | |
| EP | 3075259 A1 | 10/2016 | |
| EP | 3375290 A2 | 9/2018 | |
| FR | 2902607 B1 | 6/2019 | |
| JP | 5754564 A | 4/1982 | |
| JP | 63185998 A | 8/1988 | |
| JP | 63185999 A | 8/1988 | |
| JP | H07179334 A | 7/1995 | |
| JP | 2011097928 A | 5/2011 | |
| JP | 4750901 B2 | 8/2011 | |
| JP | 06189687 B2 | 3/2015 | |
| KR | 101409213 B1 | 6/2014 | |
| WO | 8809622 A1 | 12/1988 | |
| WO | 9112730 A2 | 9/1991 | |
| WO | 1991012730 A2 | 9/1991 | |
| WO | 9312667 W | 7/1993 | |
| WO | 1998044807 A1 | 10/1998 | |
| WO | 0150882 W | 7/2001 | |
| WO | 2005074704 A1 | 8/2005 | |
| WO | 2005091995 A2 | 10/2005 | |
| WO | 2007019227 A1 | 2/2007 | |
| WO | 2009155350 A1 | 12/2009 | |
| WO | 2014186567 A1 | 11/2014 | |
| WO | 2015004448 A1 | 1/2015 | |
| WO | 2015109276 A1 | 7/2015 | |
| WO | WO-2016154441 A1 * | 9/2016 | ............ A23J 1/006 |
| WO | WO-2017011625 A1 * | 1/2017 | ............ A23L 19/09 |
| WO | 2017040273 A2 | 3/2017 | |
| WO | 2017058501 A1 | 4/2017 | |
| WO | 2017081347 A2 | 5/2017 | |
| WO | 2017165748 A1 | 9/2017 | |
| WO | 2017165756 A1 | 9/2017 | |
| WO | 2017189322 A1 | 11/2017 | |
| WO | 2018058150 A1 | 3/2018 | |
| WO | 2018237030 A1 | 12/2018 | |
| WO | 2019028263 A2 | 2/2019 | |
| WO | 2019060179 A1 | 3/2019 | |
| WO | 2019060673 A1 | 3/2019 | |

OTHER PUBLICATIONS

International Standard ISO) Native starch—Determination of starch content—Ewers polarimetric method. ISO 10520. Sep. 1997.

Solvay Interox) "Hydrogen Peroxide Controlling reduced sulphur compounds" Mar. 2011; [retrieved May 25, 2017]. Retrieved from the Internet: <URL:http://www.solvay.com/au/en/binaries/Controlling%20reduced%20suphur%20species-202502.pdf>.

"Extrusion technology and its equipment", Up-fate Food Processing, Liu Cheng et al, Beijing University of Technology Pres, Dec. 1998, 1st Edition, p. 404-409.

"Instant Food", Gao Fucheng, China Light Industry Press Ltd., Jun. 2000, 1st Edition, p. 220-222.

Anderson, "Detoxification of Aflatoxin-Contaminated Corn", Proc. Symp. held in Atlanta, Ga., Jan. 26-27, 1982. Soth. Coop. Ser. Bull. 279:87-90 (Year: 1982).

Anderson, R. A.; "Detoxification of Aflatoxin-Contaminated Corn", Cereal Chemistry, 55, 87-90, Jan. 31, 1978.

Anderson, Timothy J., et al., "Development of New Method for Extraction of a-Zein from Corn Gluten Meal Using Different Solvents", Cereal Chem. 88(4): 356-362, 2011.

Anderson, Timothy J., et al., "Zein Extraction from Corn, Corn Products, and Coproducts and Modifications for Various Applications: A Review", Cereal Chem. 88(2): 159-173, 2011.

(56) References Cited

OTHER PUBLICATIONS

Anderson, Timothy James, "Extraction of zein from corn co-products", Master thesis, 2011, Food Science and Technology, Iowa State University, pp. i-v and 1-114.
Argos et al. (in J. Biol Chem. vol. 217 (17): pp. 9984-9990, 1982).
Bookwalter Corn Distillers Grains and Other By-Products of Alcohol Production in Blended Foods. II. Sensory, Stability, and Processing Studies, Cereal Chem. vol. 61, No. 6, 1984, 509-513.
Bryla, Marcin, et al., "Effects of pH and Temperature on the Stability of Fumonisins in Maize Products", Toxins 2017, 9, 88; doi:10.3390/toxins9030088.
Burns TD et al: Fumonisin concentrations and in vivo toxicity of nixtamalized Fusarium verticillioides culture material: Evidence for fumonisin-matrix interactions, Food and Chemical Toxicology, Pergamon, GB, vol. 46, No. 8, Aug. 1, 2008 (Aug. 1, 2008), pp. 2841-2848, XP022939030, ISSN: 0278-6915, DOI: 10.1016/J.FCT.2008.05.017 [retrieved on May 29, 2008].
CIELAB color space—Wikipedia; https://en.wikipedia.org/wiki/CIELAB_color_space; retrieved Oct. 5, 2019; 9 pages.
Database WPI, Week 198219, Thomson Scientific, London, GB; AN 1982-38049E, XP002794657, & JPS5754564A (Nippon Shokuhin Kako KK), Apr. 1, 1982 (Apr. 1, 1982).
Dickey, L.C., "Ethanolic Extraction of Zein from Maize", Industrial Crops and Products 13 (2001), Apr. 30, 2000, 67-76.
Dougls, "What is the difference betwen corn meal& corn gluten meal?", published Jul. 8, 2011, web link: https://healthfully.com/302484-what-is-the-difference-between-corn-meal-corn-gluten-meal.html (Year: 2011).
El-Hawwary et al. (in Agric. Res. Review 67 (4): 611-618, 1989).
Gomez, M.H., et al., "Changes in the Starch Fraction During Extrusion-cooking of Corn", Food Science, vol. 48, Issue 2 (Mar. 1983); pp. 378-381, XP055512137.
Gupta Ho et al: "Plant Foods for Human Nutrition 52: Processing of maize germ oil cake into edible food grade meal and evaluation of its protein quality", Plant Foods for Human Nutrition, vol. 52, Mar. 1, 1998 (Mar. 1, 1998), pp. 1-8, XP055808466, Retrieved from the Internet: URL:https://link.springer.com/content/pdf/10.1023/A:1008088822395.pdf>.
Hojilla-Evangelista M P et al, "Sequential Extraction Processing of High-Oil Corn", Cereal Chemistry, AACC International Inc, US, (Nov. 1, 2003), vol. 80, No. 6, ISSN 0009-0352, pp. 679-683, XP001185001.
Hojilla-Evangelista Met al: "Optimizing extraction of zein and glutelin-rich fraction during sequential extraction processing of com", Cereal Chemistry, AACC International Inc, US, vol. 80, No. 4, Jan. 1, 1979 (Jan. 1, 1979), pp. 481-484, XP009092386, ISSN: 0009-0352, DOI:10.1094/CCHEM.2003.80.4.481.
Hojilla-Evangelista MP et al: "Characterization of Protein Extracted From Flaked, Defatted, Whole Corn by the Sequential Extraction Process!", Journal of the American Oil Chemists Society, Springer, DE, vol. 69, No. 3, Mar. 1, 1992 (Mar. 1, 1992), pp. 199-204, XP000245384, ISSN: 0003-021X, DOI: 10.1007/BF02635886.
Ho-Soo Lim et al, "Comparison of four different methods for the determination of sulfites in foods marketed in South Korea", Food Additives & Contaminants: Part A, (20140116), vol. 31, No. 2, doi:10.1080/19440049.2013.857048, ISSN 1944-0049, pp. 187-196, XP055627607.
Inglett, GE et al. High-shear, Jet-cooking, and Alkali Treatment of Corn Distillers' Dried Grains to Obtain Products with Enhanced Protein, Oil and Phenolic Antioxidants. Food Science and Technology International, vol. 16, No. 4, Jul. 9, 2010, pp. 297-308.
Ivanova et al. "Producing of Feed protein concentrates as a method for rational utilization of recyclable fish materials" Food processing Industry Issue 12 2011 abstract.
Johansson, D et al., Influence of Surface lipids in Commercial Zein on Microstructure and Rheological Properties of Gluten-Free Dough, Annual Transactions of the Nordic Theology Society, vol. 20, 2012, pp. 247-251.
Johnson et al., "Optimizing Extraction of Zein and Glutelin-Rich Fraction During Sequential Extraction Processing of Corn", Cereal Chem. vol. 80, No. 4, 2003, 481-484.
Lawton, JW, "Zein: A History of Processing and Use", Cereal Chemistry., (2002), vol. 79, No. 1, pp. 1-18, XP009092326.
Mao et al. (in Int. J. Mol. Sci. 15, 2003-2014, 2014).
Mary A. Dombrink-Kurtzman et al: Effect of Nixtamalization (Alkaline Cooking) on Fumonisin-Contaminated Corn for Production of Masa and Tortillas, Journal of Agricultural and Food Chemistry, vol. 48, No. 11, Nov. 1, 2000 (Nov. 1, 2000), pp. 5781-5786, XP055564817, US ISSN: 0021-8561, DOI: 10.1021/jf000529f.
McNeillie, Alastair, and Juli Bieser. "Hydrogen peroxide uses for the year 2000." Food Processing Oct. 1993: 59+. Business Insights: Global. Web. Feb. 9, 2016.
Momany, Frank A., et al., "Structural Characterizations of a Zein", Journal of Agricultural and Food Chemistry, 2006, 54, 543-547.
Nielsen et al. (in Cereal Chemistry, vol. 47 (5): pp. 501-512, 1970).
Parris Net al: "Extraction and Solubility Characteristics of Zein Proteins From Dry-Milled Corn", Journal of Agricultural and Food Chemistry, American Chemical Society, US, vol. 49, No. 8, Aug. 1, 2001 (Aug. 1, 2001), pp. 3757-3760, XP001071383, ISSN: 0021-8561, DOI: 10.1021/JF0011790.
Paulson et al. (1984) Can. Inst. Food Sci. Technol. J. 17:202-208.
R. Dixon Phillips et al, "Corn Protein Concentrate: Functional and Nutritional Properties", Journal of Food Science, US, (1979), vol. 44, No. 4, doi:10.1111/j.1365-2621.1979.tb03470.x, ISSN 0022-1147, pp. 1152-1155, XP055495372.
Reiners et al., "Corn Proteins: Potential for their Industrial Use" 58th Annual American Association of Cereal Chemists, 1973.
Ren Ting-ting, et al., "Research on extraction of zein and its functional properties and application", Science and Technology of Cereals, Oils and Foods. vol. 22. Issue 3, May 21, 2014.
Selling et al: "The effect of extrusion processing on Zein", Polymer Degradation and Stability, Bark I NG, GB, vol. 95, No. 12, Dec. 1, 2010 (Dec. 1, 2010), pp. 2241-2249, XP027527379, ISSN: 0141-3910.
Sessa, David J., et al., "Improved Methods for Decolorizing Corn Zein", Industrial Crops and Products 18 (2003), 55-65.
Shukla et al: "Zein: the industrial protein from corn", Industrial Crops and Products, Elsevier, NL, vol. 13, No. 3, Jan. 1, 2001 (Jan. 1, 2001), pp. 171-192, XP002459554, ISSN: 0926-6690, DOI: 10.1016/S0926-6690(00)00064-9.
Sydenham et al. J. Agric. Food Chem. 1995, vol. 43, pp. 1198-1201 (Year: 1995).
Takahara et al., JP4750901(B2)—English Translation, pp. 1-55 (Year: 2011).
Wu, Y et al., Balancing of sulfur storage in maize seed. BMC Plant Biology, vol. 12, May 30, 2012, 77.
Wu, YV et al., Protein-Rich Residue from Corn Alcohol Distillation; Fractionation and Characterization, Cereal chemistry, vol. 58, No. 4, Apr. 1981, pp. 343-347.
L Rey et al. Drugs and Pharmaceuticals Sciences "Freezing Drying Lyophilization of Pharmaceutical and Biological Products" Chap 1 2004 (Year: 2004).
Anonymous: "Establishing Instrumental color difference tolerances for your products", Jan. 1, 2008 (Jan. 1, 2008), pp. 1-17, XP093085388, Retrieved from the Internet: URL:https://support.hunterlab.com/hc/en-us/article_attachments/201371449 [retrieved on Sep. 25, 2023].

* cited by examiner

EXTRUDED CORN PROTEIN MATERIAL

CROSS-REFERENCE TO RELATED APPLICATIONS

This application is a national phase application of International Application No. PCT/US2018/045029, filed Aug. 2, 2018, which claims the benefit of U.S. Provisional Patent Application No. 62/540,107, filed Aug. 2, 2017, each of which are hereby incorporated by reference in its entirety.

TECHNICAL FIELD

This disclosure relates to an extruded food product comprising a corn protein isolate or concentrate material.

BACKGROUND

For over 100 years, corn wet milling has been used to separate corn kernels into products such as starch, protein, fiber and oil. Corn wet milling is a two-stage process that includes a steeping process to soften the corn kernel to facilitate the next wet milling process step that results in purified starch and different co-products such as oil, fiber, and protein. Further corn processing methods are now being investigated to further purify the protein co-product for incorporation into food-grade products, specifically. A combination of increasing interest on the part of consumers for protein in their diet and increasing concerns about the cost and availability of animal derived proteins is causing food companies to look increasingly for new sources of protein and uses thereof.

SUMMARY

Described herein is a food product and methods of manufacturing the same, comprising a corn protein isolate or corn protein concentrate and a polysaccharide; wherein the food product has a density ranging from about 40 g/L to about 350 g/L.

DETAILED DESCRIPTION

Described herein is a method of making an extruded food product and the extruded food product itself. The extruded food product is suitable for human and/or animal consumption.

The method described herein comprises blending a corn protein isolate or a corn protein concentrate and a polysaccharide to obtain a premix.

In some aspects the corn protein isolate comprises at least about 85 wt %, at least about 86 wt %, at least about 87 wt %, at least about 88 wt %, at least about 89 wt %, at least about 90 wt %, at least about 91 wt %, or at least about 92 wt %, corn protein on a dry basis. By way of non-limiting example, the corn protein isolate product may be in a range from about 85 to 98 wt %, about 86 to 98 wt %, about 87 to 98 wt %, about 88 to 98 wt %, about 89 to 98 wt %, about 90 to 98 wt %, about 91 to 98 wt %, or about 92 to 98 wt %, corn protein on dry basis. In further exemplary aspects, the corn protein isolate product may range from about 88 to 96 wt %, about 89 to 96 wt %, about 90 to 96 wt %, about 91 to 96 wt %, about 92 to 96 wt %, about 88 to 95 wt %, about 88 to 94 wt %, about 88 to 93 wt %, about 88 to 92 wt %, about 88 to 91 wt %, or about 88 to 90 wt %, corn protein on dry basis. For example, in at least certain preferred aspects, the corn protein isolate product may range from about 87 to 92 wt %, such as about 88 to 92 wt %, about 89 to 92 wt %, or about 90 to 92 wt %, corn protein on a dry basis. The amount of protein present in the corn protein isolate is measured by various conventional methods, for example by using a TruMac® analyzer (Model 630-300-300, LECO Corporation, St. Joseph, MI) using 6.25 as a nitrogen-to-protein conversion factor.

In some aspects, the corn protein isolate has an "a*" color value in a range from about −0.6 to 1.5, about −0.6 to 0.5, about −0.5 to 0.5, about −0.4 to 0.5, about −0.3 to 0.5, about −0.2 to 0.5, or about −0.1 to 0.5. In further exemplary aspects, the "a*" color value may be in a range from about −0.6 to 0.3, about −0.5 to 0.3, about −0.4 to about 0.3, about −0.3 to 0.3, about −0.2 to 0.3, or about −0.1 to 0.3. For example, in at least certain preferred aspects, the "a*" value may range from about −0.6 to −0.1, about −0.6 to −0.2, about −0.5 to −0.1, or about −0.5 to −0.2.

Further, the corn protein isolate may have a "b*" color value in a range from about 10 to about 25, about 10 to about 22, or about 10 to 20. For example, in at least certain preferred aspects, the "b*" value may range from about 10 to 16, about 10 to 15, about 10 to 14, or about 10 to 13.

Color is measured using a HunterLab Colorimeter (Model CFE2, Hunter Associates Laboratory, Inc., Reston, VA). The instrument reads out in the Hunter "a*" and "b*" scale where the "a*" represents the red-green color spectrum with a positive value indicating a red hue and the "b*" represents the yellow-blue spectrum with a positive value indicating a yellow hue. All measurements were made on dry powders.

The corn protein isolate may have an oil content less than about 1.5 wt % (db), less than about 1 wt % (db), less than 0.5 wt % (db), less than 0.1 wt % (db), or no detectable presence of oil, in the corn protein isolate product. Oil content is measured by extracting and weighing total crude fat using a SPEX-Mill 8000M.

Methods for producing such a corn protein isolate are described in International PCT Application WO 2016/154441 which is hereby incorporated by reference in its entirety.

In some aspects, the corn protein concentrate comprises 55-80 wt % corn protein on a dry basis (db), and in preferred aspects a corn protein concentrate product comprising 55-75 wt % (db) corn protein. The corn protein concentration has an oil less than about 2 wt % (db), more preferably less than 1.5 wt % (db) and even more preferably less than 1 wt % (db). The corn protein concentrate has an "a*" color value ranging from about 0 to about 4 (and more preferably between 0 and 2), a "b*" color value ranging from about 15 to about 35 (and more preferably between 15 and 30), and an "L*" color value ranging from about 70 to about 90 (and more preferably between 80 and 90).

Methods for producing such a corn protein concentrate are described in International PCT Application PCT/US17/23999 which is hereby incorporated by reference in its entirety.

The particle size of the corn protein isolate or concentrate may have an effect on the extrusion. Particle size can range from more than 1 μm to less than 300 μm (small), from 600 μm to 1200 μm (medium), or from 1200 μm to 1700 μm (large).

In preferred aspects, the polysaccharide can be a starch product. Typically, the starch can be derived from rice, corn, pea, wheat, oats, rye, potato, cassava or a mixture thereof. Preferably, the starch is a starch-rich flour, such as corn flour, wheat flour, etc.

Additional ingredients beyond corn protein isolate or concentrate and the polysaccharide can be added to the premix. For example, the premix can further comprise a fiber component such as whole grain corn or corn bran. As another example, the premix can further comprise at least one of sodium bicarbonate, sodium carbonate, sugar, malt extract, corn syrup, brown rice syrup, and molasses. Ingredients can be added to enhance the flavor, color, texture, appearance, nutrition, and/or other properties of the premix.

Additional protein sources can also be added to the premix. Typically, said protein source is derived from pea, soy, milk, canola, algae, insect, and/or wheat. In aspects where an additional protein source is added to the premix, corn protein isolate or concentrate ranges from about 10 wt % to about 60 wt % of the combination of corn protein isolate or concentrate and the additional protein source.

Producers of extruded protein-enriched pieces might choose to blend proteins for various reasons. Replacing a single protein with a blend of proteins may result in a product with better nutritional properties, for example a better amino acid score or higher total leucine. Replacing a single protein with a blend of proteins may result in a better sensory effect, for example better flavor or texture. Replacing a single protein with a blend of proteins might result in better handling characteristics (less attrition, better syrup uptake) or better fit to packaging (bulk density). Replacing a single protein with a blend of proteins might result in better extruder or peripheral equipment operations, for example through lower mechanical energy costs. As the various examples provided herein demonstrate, inclusion of corn protein alone or in combination can result in processes and products with desirable attributes.

In the premix, corn protein isolate or concentrate is present in an amount ranging from 10 wt % to 90 wt %, in some aspects 20 wt % to 80 wt %, and in some aspects 30 wt % to 90 wt %.

The corn protein isolate or concentrate and polysaccharide and optional components are blended together to obtain a premix. The premix is then cooked, preferably by extrusion technique, to obtain a cooked dough product. The cooked dough product is preferably an extruded crisp product, an extruded puff product, or an extruded hoop product characterized by having a density ranging from about 40 g/L (65.55 g/100 in$^3$) to about 350 g/l (573.55 g/100 in$^3$). In some aspects, the density ranges from about 40 g/L (65.55 g/100 in$^3$) to about 80 g/L (131.1 g/100 in$^3$) and 75 g/L (122.90 g/100 in$^3$) to 95 g/L (155.68 g/100 in$^3$). In other aspects, the density ranges from about 250 g/L (409.68 g/100 in$^3$) to about 350 g/L (573.55 g/100 in$^3$). It is surprising that lower density ranges such as from about 40 g/L to about 80 g/L can be achieved with such high protein content.

There is a desire to create protein supplemented cooked dough food products that can take on the form of a "puff" or "crisp" or "hoop" for snacks or ready-to-eat cereal applications. Generally, the cooked dough food product can be formed by any conventionally known cooking method. For example, the premix can be cooked using hot air, microwave heating, an atmospheric cooker or an extruder. A preferred aspect of the present invention is utilizing an extrusion technique to form the cooked dough food product.

It shall be understood that protein ingredients generally resist expansion in an extruder. Typically, the higher the protein concentration in a mass being extruded, the higher the final product density. Rather than having a light, crisp texture, high protein crisps are heavy and hard. It is surprising that the corn protein isolate described herein is capable of extrusion to obtain a light, crisp texture.

One skilled in the art of extrusion will know that the configuration of the screw(s), the available die area, the temperature profile, and throughput rate can be managed to optimize the behavior of any mix.

In aspects of the present invention, the premix is fed through and cooked in an extruder, for example a twin screw extruder. The premix can be introduced in a dry feed form, however in preferred aspects the premix is introduced in a dry feed form at rates ranging between about 45 and about 3500 pounds per hour and subsequently combined with a liquid such as water. Water or other liquid ingredients can be separately introduced such that the total feed (premix and water) ranges between about 50 and about 5000 pounds per hour depending on the extruder being used. The water mixes with the premix to form a dough. Water can range from about 10 wt % to about 30 wt % of the total feed. During extrusion, the premix passes through different zones in the extruder barrel that mix, shear and compress the material. The screw(s) conveying the dough compress the dough raising the temperature and "melting" the dough. This mass is then sheared which leads to re-alignment and entanglement of strands in the materials.

The processing conditions of the extruder can vary in order to achieve a desired cooked dough food product. In aspects herein, shaft speeds typically range from about 250 rpm to 450 rpm, and in some aspects from 300 to about 325 rpm. One skilled in the art would appreciate that shaft speed will be adjusted depending on the size and configuration of the equipment to obtain the desired product characteristics. In aspects herein, shaft torque typically range from about 55% to about 80%, preferably 60% to about 62% for corn protein isolate, and preferably 60% to about 68% for corn protein concentrate. One skilled in the art will appreciate that shaft torque is a general indicator of the amount of energy being applied and the absolute amount of energy would depend on equipment size and configuration. Without being bound to any particular theory, it is believed that the use of corn protein in extrusion processes provides a more efficient use of energy as compared to protein-rich formulas lacking corn protein.

In aspects herein, die plate pressure typically range from about 800 psi to about 1100 psi. In aspects herein, die temperature typically range from about 310° F. to about 320° F. In aspects herein, cutter speed typically ranges from about 45% to about 100%. In aspects herein, the various barrel zone temperatures typically range from about 150° F. to about 325° F.

At the die plate, the dough is forced through small openings which causes a pressure drop. In this pressure drop, the water suddenly boils away causing the dough to expand and cool. The cooling product loses its plasticity and assumes its final shape. The product is subsequently dried.

After the extruder, the cooked dough food product is dried utilizing a dryer at a temperature typically ranging from 215° F. to about 275° F. with a residence time in the dryer typically ranging from about 2 minutes to about 25 minutes, depending on the type and configuration of the dryer. The moisture content in the dried cooked dough food product preferably ranges from about 2 wt % to about 10 wt %, and more preferably from about 3 wt % to about 7 wt %.

In the case of high protein extrusion, the protein particles must hydrate to become potentially plastic; typically this requires between 15 and 35 wt % water. Too much water makes the mass too plastic and it is difficult to achieve sufficient pressure for expansion. Too little water and the mass does not become plastic until a much higher temperature, risking decomposition or "burning" of the product. In a well-run extruder, the hydrated mass is heated and mixed to become a cohesive flowable mass. During the cooling after the dough passes the extruder die, the product "freezes" into its final form. Proteins that resist the expansion, perhaps because of poor hydration, excess glass transition temperature, or too high a viscosity will flow poorly and set as small dense particulates.

Not all proteins will behave the same during or after extrusion, so differences between ingredients must also be considered. Extrusion of protein-rich materials is complex, and the following discussion is intended to illustrate that complexity. For example, the glass transition temperature represents the transition temperature of amorphous solids from a hard, glassy state to a softer, rubbery state. Typical glass transition temperatures for proteins range from 130° C. to 200° C. at 0% moisture. In more everyday terms, the material transitions from a rigid to a flowable mass. This is dependent on the moisture content and molecular weight of the protein, among other things. As moisture increases, the glass transition temperature decreases. For most practical protein ingredients, the molecular weight is the weighted composite molecular weight of the thermodynamically-compatible proteins present. Hydrolyzed proteins decrease the glass transition temperature while crosslinked proteins increase it. Altogether, the glass transition is manipulated by moisture and temperature to obtain the desired flowability for extrusion within the context of the ingredient properties.

Other molecular properties relevant to protein performance in an extruder include viscosity and hydration rate. Viscosity is dependent on molecular weight and the interactions between individual protein molecules. Small or weakly interactive proteins generally have low viscosity while large or strongly interactive proteins have high viscosity. In the extruder at elevated temperature, the shear of the screw allows proteins in a plastic state to partially align to form the structure of the final product. Proteins with excessive viscosity will resist alignment, requiring more heat or more torque to achieve the desired state of alignment. Hydration rate is important because most extruders have short residence times and water or steam addition has a short time to hydrate the protein-rich mass. Extrusion of protein-rich products commonly use between 20 and 30 wt % in-process hydration levels to achieve the desired protein plasticity and subsequent pressure drop.

An ingredient designer can take note of the characteristics of a protein ingredient, such as hydration rate or glass transition temperature and take advantage of the protein's properties, or modify them. Modification might be in the form of adding another protein to the mixture to "balance" the properties. Other types of modification could include partial hydrolysis or surface treatment of the protein.

Without being bound to any particular theory, it is believed that corn protein concentrate or isolate influences extruder functionality therefore enabling a high protein product to have a light, crisp texture.

Particle size and intrinsic density can have numerous potential effects in extrusion. For example, a material of low density will result in a low mass of material in the extruder barrel which decreases the number and intensity of interactions between ingredient particles which results in less time for molecules in different particles to form a cohesive mass which results in a weaker structure at the pressure drop. In contrast, large dense particles permit high densities of materials in the barrel, leading to many intense interactions, and development of strong structures.

Without being bound by theory, the expansion properties of proteins may be managed in part by modifying the protein ingredient particle size and intrinsic density which acts on extruder performance through a combination of density and hydration effects.

EXAMPLES

The following examples are presented to illustrate the present invention and to assist one of ordinary skill in making and using the same.

Example 1: Corn Protein Isolate at a 35% Ingredient Addition Rate

A premix formulation of 64.5 wt % rice flour (Gulf Pacific, lot 10-29-15 45325LGWI-42306 LGRF 450-66), 35 wt % corn protein isolate (Cargill, CPI-P-051016), and 0.5 wt % sodium bicarbonate (AB Mauri, N102917 PMHBS1) was made by adding the ingredients to a Leland Southwest Double Action Paddle mixer and blending for 7-10 minutes. Note the corn protein isolate was sifted prior to inclusion in the premix, corn protein isolate material passing through a #16 sieve was utilized for the premix. The premix was introduced to a Baker Perkins MPF24 (24 mm diameter, 25:1 L/D) twin screw extruder based on the processing parameters illustrated in Table 1.

TABLE 1

| Sample Number | | | # | 1 |
|---|---|---|---|---|
| Sample ID | | | Name/Code | CPI |
| Extruder Operation Data | | | Time | 11:27 |
| Shaft Speed (rpm) | | | Set Point | 300 |
| Shaft Torque (%) | | | Measured | 58/65 |
| Die Pressure (psi) | | | Measured | 870 |
| Die Temp (° F.) | | | Measured | 316 |
| Cutter Speed (%) | | | Set Point | 47 |
| Dry Feed (lb/hr) | | | Set Point | 47 |
| | | | Measured | 46.9 |
| Liquid #2 (water, %, lb/hr) | time (min) | weight (g) | Set Point | 36.5 |
| 100% output of pump | 2 | 230.2 | Measured | 36.5 |
| | | | Calculated | 5.6 |
| Total Feed (lb/hr) | | | Calculated | 52.5 |
| Water percentage (% of total incoming feed) | | | Calculated | 10.6 |
| Barrel Zone Temp (° F.) | | | #3 Set Point | 170 |
| | | | #3 Measured | 170 |
| | | | #4 Set Point | 250 |
| | | | #4 Measured | 250 |
| | | | #5 Set Point | 300 |
| | | | #5 Measured | 300 |
| | | | #6 Set Point | 305 |
| | | | #6 Measured | 299 |
| Bulk Density (g/100 in$^3$) | | | | 93.9 |
| Pellet count (per 10 grams) | | | | |
| Dry feed calibration (max. lb/hr) | | | 88.606 | |

After the cooked dough product finishes in the extruder, it is dried using an Aeroglide Tray Dryer at a temperature of 250° F. for a 3 minute residence time. The dried, cooked dough product has a density of 93.9 g/100 in$^3$ (57.3 g/L) and a moisture content of 5.05%.

Example 2: Corn Protein Isolate at an 80% Ingredient Addition Rate

A premix formulation of 19.5 wt % rice flour (Gulf Pacific, lot 10-29-15 45325LGWI-42306 LGRF 450-66), 80 wt % corn protein isolate (Cargill, CPI-P-050216), and 0.5 wt % sodium bicarbonate (AB Mauri, N102917 PMHBS1) was made by adding the ingredients to a Leland Southwest Double Action Paddle mixer and blending for 7-10 minutes. Note the corn protein isolate was sifted prior to inclusion in the premix, corn protein isolate material passing through a #16 sieve was utilized for the premix. The premix was introduced to a Baker Perkins MPF24 (24 mm diameter, 25:1 L/D) twin screw extruder based on the processing parameters illustrated in Table 2.

TABLE 2

| Sample Number | | | # | 1 |
|---|---|---|---|---|
| Sample ID | | | Name/Code | CPI |
| Extruder Operation Data | | | Time | 11:09 |
| Shaft Speed (rpm) | | | Set Point | 300 |
| Shaft Torque (%) | | | Measured | 71 |
| Die Pressure (psi) | | | Measured | 800 |
| Die Temp (° F.) | | | Measured | 319 |
| Cutter Speed (%) | | | Set Point | 70 |
| Dry Feed (lb/hr) | | | Set Point | 47 |
| | | | Measured | 46.9 |
| Liquid #2 (water, %, lb/hr) | time (min) | weight (g) | Set Point | 38 |
| 100% output of pump | 2 | 236.1 | Measured | 37.8 |
| | | | Calculated | 5.9 |
| Total Feed (lb/hr) | | | Calculated | 52.8 |
| Water percentage (% of total incoming feed) | | | Calculated | 11.2 |
| Barrel Zone Temp (° F.) | | | #3 Set Point | 170 |
| | | | #3 Measured | 170 |
| | | | #4 Set Point | 250 |
| | | | #4 Measured | 250 |
| | | | #5 Set Point | 300 |
| | | | #5 Measured | 299 |
| | | | #6 Set Point | 305 |
| | | | #6 Measured | 305 |
| Bulk Density (g/100 in$^3$) | | | | 68.5 |
| Pellet count (per 10 grams) | | | | |
| Dry feed calibration (max. lb/hr) | | | 82.937 | |

After the cooked dough product finishes in the extruder, it is dried using an Aeroglide Tray Dryer at a temperature of 250° F. for a 3 minute residence time. The dried, cooked dough product has a density of 68.5 g/100 in$^3$ (41.8 g/L) and a moisture content of 5.23%.

Example 3: Corn Protein Isolate at an 88 Ingredient Addition Rate

A premix formulation of 12 wt % rice flour (Gulf Pacific, lot 10-29-15 45325LGWS-42306 LGRF 450-66) and 88 wt % corn protein isolate (Cargill) was made by adding the ingredients to a Leland Southwest Double Action Paddle mixer and blending for 7-10 minutes. Note the corn protein isolate was sifted prior to inclusion in the premix, corn protein isolate material passing through a #16 sieve was utilized for the premix. The premix was introduced to a Baker Perkins MPF24 (24 mm diameter, 25:1 L/D) twin screw extruder based on the processing parameters illustrated in Table 3.

TABLE 3

| Sample Number | | | # | 1 | 2 |
|---|---|---|---|---|---|
| Sample ID | | | Name/Code | CPI | CPI |
| Extruder Operation Data | | | Time | 10:19 | 10:26 |
| Shaft Speed (rpm) | | | Set Point | 300 | 325 |
| Shaft Torque (%) | | | Measured | 80 | 76 |
| Die Pressure (psi) | | | Measured | 1010 | 1010 |
| Die Temp (° F.) | | | Measured | 315 | 312 |
| Cutter Speed (%) | | | Set Point | 100 | 100 |
| Dry Feed (lb/hr) | | | Set Point | 45 | 45 |
| | | | Measured | 44.9 | 44.9 |
| Liquid #2 (water, %, lb/hr) | time (min) | weight (g) | Set Point | 40 | 39 |
| 100% output of pump | 2 | 240.5 | Measured | 40.1 | 39 |
| | | | Calculated | 6.4 | 6.2 |
| Total Feed (lb/hr) | | | Calculated | 51.3 | 51.1 |
| Water percentage (% of total incoming feed) | | | Calculated | 12.4 | 12.1 |
| Barrel Zone Temp (° F.) | | | #3 Set Point | 170 | 170 |
| | | | #3 Measured | 170 | 170 |
| | | | #4 Set Point | 240 | 240 |
| | | | #4 Measured | 240 | 240 |
| | | | #5 Set Point | 280 | 260 |
| | | | #5 Measured | 280 | 260 |
| | | | #6 Set Point | 280 | 260 |
| | | | #6 Measured | 281 | 264 |
| Bulk Density (g/100 in$^3$) | | | | 87.7 | 76.0 |
| Pellet count (per 10 grams) | | | | | |
| Dry feed calibration (max. lb/hr) | | | 92.143 | | |

After the cooked dough product finishes in the extruder, it is dried using an Aeroglide Tray Dryer at a temperature of 250° F. for a 3-minute residence time. The dried, cooked dough product (CPI-1) has a density of 87.7 g/100 in$^3$ (53.3 g/L) and a moisture content of 3.84%. The dried, cooked dough product (CPI-2) has a density of 76.0 g/100 in$^3$ (46.4 g/L) and a moisture content of 3.94%.

Example 4: Corn Protein Isolate Particle Size Effect on Extruded Food Product Properties ("Puffs")

This experimentation captures the impact that corn protein isolate has on extruded food products shaped as "puffs" (puff shape similar to that found in Kix® cereal). Individual lots of corn protein are blended together, then milled to targeted particle sizes. Particle sizes are categorized as small (less than 300 µm), medium (600-1200 µm) and large (1200-1700 µm). The small corn protein isolate (lot 18032204CPM) is prepared from a blend of several lots. The medium corn protein isolate (lot 18032804CP), and large corn protein isolate (lot 18041101CP) lots are sized from the same corn protein blend. Particle size control was achieved by milling with or without screening.

A Baker Perkins, 24 mm (25:1 L/D) twin screw extruder is used for the trial. The die at the end of the extruder has a single 4 mm opening and product is cut upon exit of the die using a 4-blade knife; the product was spherically shaped. Formulas compared corn protein isolate particle sizes with an ingredient usage rate of 30% (see Table 4), equating to 31% protein (see Table 5). The ingredients to create test formulas are weighed and blended for about 10 minutes.

TABLE 4

| Ingredient | Control Formulation (no corn protein isolate) % | Corn Protein Isolate Formulation % |
|---|---|---|
| Whole Grain Corn Flour | 70.0 | 48.6 |
| Corn Cones | 28.0 | 19.4 |
| Corn Protein 90 (small, medium or large) | 0.0 | 30.0 |

TABLE 4-continued

| Ingredient | Control Formulation (no corn protein isolate) % | Corn Protein Isolate Formulation % |
|---|---|---|
| Salt | 0.5 | 0.5 |
| Sodium bicarbonate | 0.5 | 0.5 |
| CaCO$_3$ | 1.0 | 1.0 |
| Total | 100 | 100 |

TABLE 5

| | Control | Corn Protein 90 (small, medium, large) |
|---|---|---|
| Protein (%) | 7.1 | 31.0 |

Table 6 shows the particle size metrics of the corn protein isolate of different particle sizes analyzed using a Malvern Particle Size Analyzer (laser diffraction; dry dispersion, particle refraction 1.5, dispersant 1.0) where D10 is the particle diameter below which 10% of the total volume exists, D50 is the particle diameter below which 50% of the total volume exists and D90 is the particle diameter below which 90% of the total volume exists.

TABLE 6

| | Volumetric Mean Diameter | Diameter on % (μm) | | |
|---|---|---|---|---|
| Sample | (μm) | D10 | D50 | D90 |
| 18032204CPM (less than 300 μm) | 207 | 10 | 164 | 480 |
| 18032804CP (600-1200 μm) | 608 | 134 | 553 | 1140 |
| 18041101CP (1200-1700 μm) | 851 | 397 | 771 | 1458 |

Density of the extruded food products are also measured, and Table 7 provides those values for before and after drying. Comparison of extruded densities show the density increases as corn protein isolate particle size increases.

TABLE 7

| Experiment | Density (g/100 in$^3$) before drying | Density (g/100 in$^3$) after drying | Moisture (%) after drying |
|---|---|---|---|
| Control | — | 125.5 | 2.90 |
| Corn Protein 90, small less than 300 μm | 122.6 | 125.1 | 2.19 |
| Corn Protein 90, medium 600-1200 μm | 129.7 | 133.2 | 2.52 |
| Corn Protein 90, large 1200-1700 μm | 146.2 | 152.8 | 2.45 |

Hardness of the extruded food products are also measured using a TA.HD Plus Texture analyzer with a 12.5 mm Delrin cylindrical probe from Texture Technologies (n=20) is shown in Table 8. None of the corn protein containing formulas were as hard as the control; but the product made with small sized corn protein was softer than those made from the medium or large sized ingredients.

TABLE 8

| | Control | Corn Protein, Small | Corn Protein, Medium | Corn Protein, Large |
|---|---|---|---|---|
| Average Hardness (g) | 2450 | 1568 | 2013 | 1964 |
| Standard Deviation | 360 | 457 | 487 | 475 |
| n | 20 | 20 | 20 | 20 |
| cv | 14.9 | 29.1 | 24.2 | 24.2 |

To understand the impact of the proteins on the extruder, shaft torque (torque), die pressure and die temperature were captured (Table 9). These measures provided an indication of the direction (more, less, same) amount of work required for the extruder to extrude formulas containing each different size of protein particle. The trial demonstrates that the addition of corn protein decreases shaft torque, a measure of work the extruder is exerting, by an average of 12.5% as compared with the control.

TABLE 9

| Experiment | Shaft Torque (%) | Die Pressure (psi) | Temperature (F.) at die |
|---|---|---|---|
| Control | 69 | 610 | 294 |
| Corn Protein 90, small less than 300 μm | 61 | 640 | 293 |
| Corn Protein 90, medium 600-1200 μm | 61.5 | 630 | 294 |
| Corn Protein 90, large 1200-1700 μm | 60.5 | 635 | 296 |

Example 5: Corn Protein Isolate and Blends Effect on Extruded Food Product Properties ("Hoops")

This experimentation captures the impact corn protein isolate and corn protein isolate blends with other protein sources has on extruded food products shaped as "hoops" (hoop shape similar to that found in Cheerios® cereal). Formulas contained a constant percentage of protein ingredient with different ratios of pea and corn used to make the composition.

Table 10 shows particle size analysis on the protein ingredients used in extrusion performed on a Malvern Particle Size Analyzer (laser diffraction; dry dispersion, particle refraction 1.5, dispersant 1.0) where D10 is the particle diameter below which 1000 of the total volume exists, D50 is the particle diameter below which 50%0 of the total volume exists and D90 is the particle diameter below which 90% of the total volume exists.

TABLE 10

| Sample | Volumetric Mean Diameter (μm) | Diameter on % (μm) | | |
|---|---|---|---|---|
| | | D10 | D50 | D90 |
| Puris ® Pea Protein 870 | 44 | 15 | 39 | 80 |
| Corn Protein 90 (18032204CPM) | 207 | 10 | 164 | 480 |

The formulations of the various experiments are provided in Table 11 (totals are less than 100% due to rounding effects).

TABLE 11

| Ingredient | Control % | Pea 25 % | Pea 20, Corn 5 % | Pea 15, Corn 10 % | Pea 10, Corn 15 % | Pea 5, Corn 20 % | Corn 25 % |
|---|---|---|---|---|---|---|---|
| Corn Protein | 0.0 | 0.0 | 5.0 | 10.0 | 15.0 | 20.0 | 25.0 |
| Pea Protein | 0.0 | 25.0 | 20.0 | 15.0 | 10.0 | 5.0 | 0.0 |
| Whole Grain Corn Flour | 55.0 | 39.8 | 39.8 | 39.8 | 39.8 | 39.8 | 39.8 |
| All-Purpose Wheat Flour | 22.2 | 16.1 | 16.1 | 16.1 | 16.1 | 16.1 | 16.1 |
| Whole Grain Oat Flour | 13.3 | 9.6 | 9.6 | 9.6 | 9.6 | 9.6 | 9.6 |
| Corn Bran | 3.0 | 3.0 | 3.0 | 3.0 | 3.0 | 3.0 | 3.0 |
| Sugar | 5.0 | 5.0 | 5.0 | 5.0 | 5.0 | 5.0 | 5.0 |
| CaCO$_3$ | 0.5 | 0.5 | 0.5 | 0.5 | 0.5 | 0.5 | 0.5 |
| Salt | 0.5 | 0.5 | 0.5 | 0.5 | 0.5 | 0.5 | 0.5 |
| Total | 99.5 | 99.5 | 99.5 | 99.5 | 99.5 | 99.5 | 99.5 |

The extruder is started up with control. Transition between experiments involves the addition of material from the next formula, while the previous formula is running out. When there is a minimum of 25 lbs of the new formula in the hopper, the extruder is considered stabilized and that experiment is conducted. Once the extruder is running in a steady state, data and product are collected. To compare the expansion of different formulas and other impacts to the extruder, extrusion process settings are held consistent between the experiments.

Material is collected onto a metal screen after being cut from the die. The screen was placed in an Aeroglide Tray Dryer set to 250 degrees F. for 2 minutes. Once the dried material is cooled it was sent through a sieve type screen with agitation to separate clumped product. Table 12 provides the density of the hoop shaped extruded material before and after drying and moisture after drying.

TABLE 12

| Version | Density (g/100 in$^3$) before drying | Density (g/100 in$^3$) after drying | Moisture (%) |
|---|---|---|---|
| Control | 122.2 | 125.9 | 2.32 |
| 25 Pea | 185.1 | 201.1 | 1.98 |
| 20 Pea, 5 Corn | 169.1 | 174.5 | 1.99 |
| 15 Pea, 10 Corn | 127.4 | 128.1 | 1.61 |
| 10 Pea, 15 Corn | 117.4 | 118.6 | 1.88 |
| 5 Pea, 20 Corn | 96.4 | 97.9 | 2.07 |
| 25 Corn | 86.6 | 87.9 | 1.75 |

Figure 1:
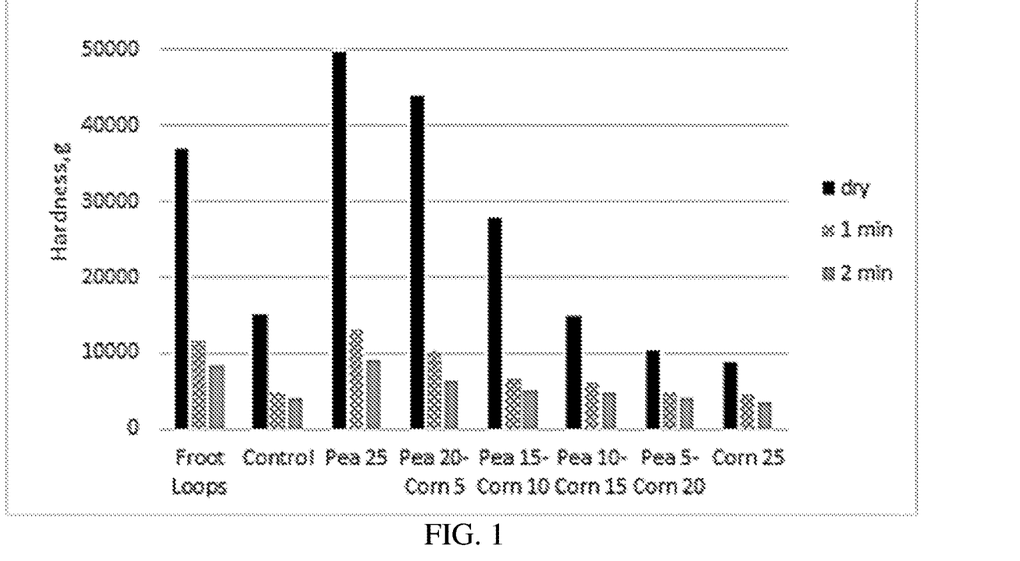
FIGS. 1 and 2 illustrate hardness of protein blends remaining after soaking in milk for one and two-minute time periods.
Figure 2:
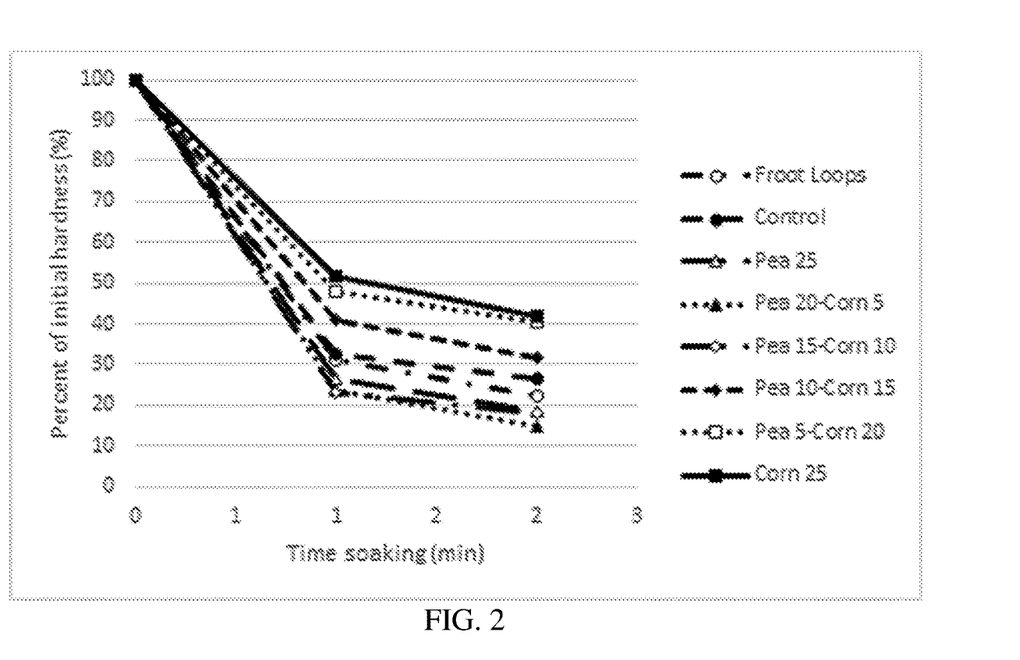

Density of the product changed as the ratio of pea to corn changed. All tests containing a majority of pea protein are the most dense. Tests with a majority of corn protein are the least dense. The density of hoops decreased with the addition of corn protein. Texture of the hoop was also quantified as hardness (in grams of force to fracture), measured using a texture analyzer. To measure the hardness (also referred to as crispiness) of the hoop-shaped cereal, 140 mL of cereal was weighed into a 150 mL beaker, crushed dry or after 0, 1 or 2 minutes soak in 2% milk using a Texture Technologies medium crispiness probe. Samples containing a majority of pea protein are the hardest. Products with 80% or greater of the protein coming from corn had average hardness values greater than the control while products with 60% or more of the protein from corn were softer than the control. Since this can be a cereal product, the bowl life of the product is also quantified using hardness as the measure. All samples are soaked in milk and hardness is measured after soaking for 1 and 2 minutes; data are reported as the mean percentage of the original (dry) hardness as demonstrated in FIGS. 1 and 2. The samples with the highest pea protein concentration are harder and the all corn is softer.

To understand the impact of the proteins on the extruder, shaft torque (torque), die pressure and die temperature are recorded. These measures provide an indication of the amount of work required for the extruder to extrude each protein-enriched formula. Table 13 provides this data.

TABLE 13

| Experiment | Shaft Torque (%) | Die Pressure (psi) | Temperature (F.) at die |
|---|---|---|---|
| Control | 75 | 970 | 295 |
| 25 Pea | 73.5 | 1175 | 291 |
| 20 Pea, 5 Corn | 72.5 | 1170 | 296 |
| 15 Pea, 10 Corn | 81 | 970 | 296 |
| 10 Pea, 15 Corn | NA* | NA* | NA* |
| 5 Pea, 20 Corn | 67.5 | 810 | 294 |
| 25 Corn | 63.5 | 750 | 291 |

*Due to an equipment malfunction, the processing data was lost at the end of the sample run Example 6: Corn Protein Isolate and Blends Effect on Extruded Food Product Properties ("Spherical Shape")

The purpose of this experiment is to compare the expansion and extrudability of protein blends containing soy, pea and corn protein of similar particle size when extruded into a spherical piece. A Baker Perkins, 24 mm (25:1 L/D) twin screw extruder is used for the trial. The die at the end of the extruder has a single 4 mm opening and product is cut upon exit of the die using a 4-blade knife. Formulas comparing protein blends of soy, pea and corn protein at an inclusion rate of 30% are evaluated. Plant proteins used for this trial are all less than 300 μm. The soy protein isolate, SUPRO 620 (lot M340072433), containing about 87% protein as is, is sourced from Solae. The pea protein is PURISPea 870 (lot 18032203TL2), containing about 80% protein as is, is sourced from Cargill. The corn protein (lot 18032203CPM) is corn protein isolate having a protein content of 90% db (87% as is). The particle size of the incoming protein ingredients is analyzed using a Malvern Particle Size Analyzer. Table 14 shows the particle size analysis performed on Malvern Particle Size Analyzer (laser diffraction; dry dispersion, particle refraction 1.5, dispersant 1.0) where D10 is the particle diameter below which 10% of the total volume exists, D50 is the particle diameter below which 50% of the total volume exists and D90 is the particle diameter below which 90% of the total volume exists.

TABLE 14

| Sample | Volumetric Mean Diameter (μm) | Diameter on % (μm) | | |
|---|---|---|---|---|
| | | D10 | D50 | D90 |
| Solae Supro620 | 157 | 21 | 136 | 334 |
| Pea Protein 870 | 44 | 15 | 39 | 80 |
| 1832203CPM | 158 | 9 | 122 | 365 |

The formulations of the various experiments are provided in Table 15. And the percent of total protein for each experiment is in Table 16.

TABLE 15

| Ingredient | No added protein Control | 30% soy 2 | 30% corn 3 | 10% pea, 10% corn, 10% soy 4 | 20% pea, 5% corn, 5% soy 5 | 30% pea 6 | 20% soy, 5% pea, 5% corn 7 | 10% pea, 10% corn, 10% soy 8 | 20% corn, 5% pea, 5% soy 9 |
|---|---|---|---|---|---|---|---|---|---|
| Whole Grain Corn Flour | 70.0% | 48.6% | 48.6% | 48.6% | 48.6% | 48.6% | 48.6% | 48.6% | 48.6% |
| Corn Cones | 28.0% | 19.4% | 19.4% | 19.4% | 19.4% | 19.4% | 19.4% | 19.4% | 19.4% |
| Pea Protein | 0.0% | 0.0% | 0.0% | 10.0% | 20.0% | 30.0% | 5.0% | 10.0% | 5.0% |
| Corn Protein | 0.0% | 0.0% | 30.0% | 10.0% | 5.0% | 0.0% | 5.0% | 10.0% | 20.0% |
| Soy Protein | 0.0% | 30.0% | 0.0% | 10.0% | 5.0% | 0.0% | 20.0% | 10.0% | 5.0% |
| Salt | 0.5% | 0.5% | 0.5% | 0.5% | 0.5% | 0.5% | 0.5% | 0.5% | 0.5% |
| sodium bicarbonate | 0.5% | 0.5% | 0.5% | 0.5% | 0.5% | 0.5% | 0.5% | 0.5% | 0.5% |
| CaCO$_3$ | 1.0% | 1.0% | 1.0% | 1.0% | 1.0% | 1.0% | 1.0% | 1.0% | 1.0% |
| Total | 100% | 100% | 100% | 100% | 100% | 100% | 100% | 100% | 100% |

TABLE 16

| | Control | 2 | 3 | 4 | 5 | 6 | 7 | 8 | 9 |
|---|---|---|---|---|---|---|---|---|---|
| Protein (%) | 0 | 27.0 | 26.10 | 25.10 | 23.60 | 22.20 | 26.05 | 25.10 | 25.60 |

The extruder was started up with control. Transition between experiments involved the addition of material from the next experiment, while the previous experiment was run out. When there was a minimum of 25 lbs of the new experimental formula in the hopper, the extruder was stabilized and that experiment was conducted. Once the extruder was running steady state, data and product were collected. To compare the proteins' expansion and impact on the extruder, extrusion process settings were held consistent between the experiments. Material was collected onto a metal screen after being cut from the die. The screen was placed in an Aeroglide Tray Dryer set to 250 degrees F. for 2 minutes. Once the dried material had cooled it was sent through a sieve type screen with agitation to separate clumped product.

The protein blends comparison of plant proteins at ingredient use levels of 150% and 30% showed differences in expansion and extrudability of the proteins. At an ingredient usage level of 150%, all proteins displayed expansion. Soy and pea protein had a rougher surface as compared with corn. Both pea and corn had pieces of consistent size while the soy protein displayed high size variability. At the 30% usage rate the proteins' impact on expansion is very evident.

Pea protein at a 30% inclusion had decreased expansion, was the most dense, and smallest in size as compared with all other tests. Blends containing a majority of either soy or pea were more ragged in appearance while samples with corn as the majority protein were smoother and rounded in appearance. The protein blend with equal parts pea, soy and corn had smoother surfaces, but inconsistency in size.

The density of all products was measured in g/100 in$^3$ at the exit of the extruder before drying and after drying and the data is shown in Table 17. The lowest density product contained soy protein as the dominant added plant protein. Products with the highest density contained pea protein as the dominant added plant protein.

TABLE 17

| Test ID | Experiment | Density (g/100 in$^3$) before drying | Density (g/100 in$^3$) after drying | Moisture (%) after drying |
|---|---|---|---|---|
| Control | Control | 151.6 | 154.1 | 3.58 |
| 2 | Soy 30 | 84.5 | 84.8 | 3.79 |
| 3 | Corn 30 | 125.3 | 128.0 | 2.63 |
| 4 | Pea 10, Corn 10, Soy 10** | 131.9 | 129.5 | 3.03 |
| 5 | Pea 20, Corn 5, Soy 5 | 151.7 | 159.3 | 2.52 |
| 6 | Pea 30 | 190.8 | 203.1 | 2.57 |
| 7 | Soy 20, Corn 5, Pea 5 | 102.1 | 106.7 | 2.41 |
| 8 | Pea 10, Corn 10, Soy 10 | 137.1 | 156.7 | 2.77 |
| 9 | Corn 20, Pea 5, Soy 5 | 124.5 | 129.6 | 2.99 |

**product flow in the extruder was poor in this case and the feed rate was decreased from 45 to 37 lbs/hr.

Hardness was measured on extruded spheres manufactured from soy, corn, pea, or blends of the three plant proteins using a texture analyzer and measured in grams of force required to fracture (n=20). Data is shown in Table 18.

TABLE 18

|  | Average Hardness (g) | Standard deviation | CV |
| --- | --- | --- | --- |
| Control | 2270.3 | 386.4 | 17.0 |
| Soy 30 | 2533.5 | 535.2 | 21.1 |
| Corn 30 | 1457.4 | 525.7 | 36.1 |
| Pea 10, Corn 10, Soy 10 | 1985.6 | 490.4 | 24.7 |
| Pea 20, Corn 5, Soy 5 | 2835.2 | 405.1 | 14.3 |
| Pea 30 | 3067.9 | 435.5 | 14.2 |
| Soy 20, Corn 5, Pea 5 | 2306.5 | 445.4 | 19.3 |
| Pea 10, Corn 10, Soy 10 | 2536.8 | 315.0 | 12.4 |
| Corn 20, Pea 5, Soy 5 | 1885.7 | 579.8 | 30.7 |

To understand the impact of the proteins on extruder conditions, shaft torque (torque), die pressure and die temperature are captured in Table 19. The measures were used to provide an indication for the direction (more, less, same) of work required for the extruder to extrude each protein.

TABLE 19

| Test ID | Experiment | Shaft Torque (%) | Die Pressure (psi) | Temperature (° F.) at die |
| --- | --- | --- | --- | --- |
| Control | Control | 60 | 625 | 294 |
| 2 | Soy 30 | 82 | 1010 | 293 |
| 3 | Corn 30 | 61.5 | 600 | 293 |
| 4 | Pea 10, Corn 10, Soy 10** | 50 | 740 | 293 |
| 5 | Pea 20, Corn 5, Soy 5 | 71 | 915 | 294 |
| 6 | Pea 30 | 65.5 | 990 | 296 |
| 7 | Soy 20, Corn 5, Pea 5 | 80 | 1015 | 295 |
| 8 | Pea 10, Corn 10, Soy 10 | 70 | 900 | 290 |
| 9 | Corn 20, Pea 5, Soy 5 | 63 | 770 | 294 |

**product flow in the extruder was poor in this case and the feed rate was decreased from 45 to 37 lbs/hr.

Example 7: Corn Protein Having Differing Protein Content Effect on Extruded Food Product Properties ("Puffs")

The purpose of this experiment is to compare the expansion and extrudability of "puff" food products containing corn protein having different protein amounts. A Baker Perkins, 24 mm (25:1 L/D) twin screw extruder is used for the experiments. The die at the end of the extruder has a single 4 mm opening and product is cut upon exit of the die using a 4-blade knife. Formulas compared corn protein at a protein level near 70% (corn protein 70) with corn protein at a protein level near 90% (corn protein 90). The ingredient usage rate was 30%, corn protein 90 is lot 18032804CP, and corn protein 70 is lot 18041102CP.

The formulation of the examples is in Table 20 with the total corn protein amount in Table 21.

TABLE 20

| Ingredient | Control % | Corn Tests % |
| --- | --- | --- |
| WG Corn Flour | 70.0 | 48.6 |
| Corn Cones | 28.0 | 19.4 |
| Corn Protein 90 or Corn Protein 70 | 0.0 | 30.0 |
| Salt | 0.5 | 0.5 |
| Sodium Bicarbonate | 0.5 | 0.5 |
| CaCO$_3$ | 1.0 | 1.0 |
| Total | 100 | 100 |

TABLE 21

|  | Control | Corn Protein 90 | Corn Protein 70 |
| --- | --- | --- | --- |
| Protein (%) | 0 | 26.1 | 19.8 |

Table 22 shows particle sizes of corn protein with different protein levels using Malvern Particle Size Analyzer (laser diffraction; dry dispersion, particle refraction 1.5, dispersant 1.0) where D10 is the particle diameter below which 10% of the total volume exists, D50 is the particle diameter below which 50% of the total volume exists and D90 is the particle diameter below which 90% of the total volume exists.

TABLE 22

| Sample | Volumetric Mean Diameter (μm) | Diameter on % (μm) | | |
| --- | --- | --- | --- | --- |
| | | D10 | D50 | D90 |
| Corn Protein 90 (18032804CP) | 608 | 134 | 553 | 1140 |
| Corn Protein 70 (18041102CP) | 480 | 98 | 397 | 981 |

The extruder is started up with control. Transition between experiments involve the addition of material from the next experiment, while the previous experiment was run out. When there is a minimum of 25 lbs of the new experimental formula in the hopper, the extruder is stabilized and that experiment is conducted. Once the extruder is stabilized, data and product are collected. To compare the protein's expansion and impact on the extruder, extruder process settings are held consistent between the experiments.

Material is collected onto a metal screen after being cut from the die. The screen is placed in an Aeroglide Tray Dryer set to 250 degrees F. for 2 minutes. Once the dried material is cooled it is sent through a sieve type screen with agitation to separate clumped product.

The density of all products is measured in g/100 in$^3$ at the exit of the extruder before drying and after drying, shown in Table 23.

TABLE 23

| Experiment | Density (g/100 in$^3$) before drying | Density (g/100 in$^3$) after drying | Moisture (%) after drying |
| --- | --- | --- | --- |
| Control | NA | 125.5 | 2.90 |
| Corn Protein 70 | 134.4 | 135.1 | 1.96 |
| Corn Protein 90 | 129.7 | 133.2 | 2.52 |

TABLE 24

|  | Control | Corn Protein 70 | Corn Protein 90, Medium |
|---|---|---|---|
| average | 2450 | 2113 | 2013 |
| Standard Deviation | 360 | 679 | 487 |
| n | 20 | 20 | 20 |
| cv | 14.9 | 32.1 | 29.1 |

To understand the impact of the proteins on extruder conditions, shaft torque (torque), die pressure and die temperature are captured in Table 25. The measures were used to provide an indication for the direction (more, less, same) of work required for the extruder to extrude each protein.

TABLE 25

| Experiment | Shaft Torque (%) | Die Pressure (psi) | Temperature (F.) at die |
|---|---|---|---|
| Control | 69 | 610 | 294 |
| Corn Protein 70 | 58.5 | 625 | 291 |
| Corn Protein 90 | 61.5 | 630 | 294 |

The invention claimed is:

1. An extruded food product, consisting of:
   a corn protein isolate present in an amount ranging from 80 to 90 wt %, the corn protein isolate having a particle size ranging from more than 1 μm to less than 300 μm, and comprising:
   (1) at least about 85 wt % corn protein on a dry basis;
   (2) an "a*" color value ranging from about −0.6 to 1.5, and a "b*" color value ranging from about 10 to 25; and
   (3) less than about 1.5% oil on a dry basis;
   rice flour; and
   optionally sodium bicarbonate;
   wherein the extruded food product has a density ranging from about 40 g/L to about 80 g/L.

2. The extruded food product of claim 1, wherein the corn protein isolate is present in an amount ranging from 80 to 88 wt %.

3. The extruded food product of claim 1, wherein the extruded food product is an extruded puff or hoop food product.

4. The extruded food product of claim 1, wherein the extruded food product is an extruded crisp food product.

5. The extruded food product of claim 1, wherein the extruded food product has a moisture content from 2 to 10 wt %.

* * * * *

UNITED STATES PATENT AND TRADEMARK OFFICE
CERTIFICATE OF CORRECTION

| | |
|---|---|
| PATENT NO. | : 11,980,217 B2 |
| APPLICATION NO. | : 16/635673 |
| DATED | : May 14, 2024 |
| INVENTOR(S) | : Tasha Joy Hermes, Michael A. Porter and Chad Rieschl |

It is certified that error appears in the above-identified patent and that said Letters Patent is hereby corrected as shown below:

On the Title Page

In Page 2, Column 2 (item (56) Other Publications), Line 1, delete "International" and insert -- (International --, therefor.

In Page 2, Column 2 (item (56) Other Publications), Line 3, delete "Solvay" and insert -- (Solvay --, therefor.

In the Specification

In Column 7, Line 44, delete "88" and insert -- 88% --, therefor.

In Column 7, Line 47, delete "45325LGWS" and insert -- 45325LGWI --, therefor.

In Column 10, Line 51, delete "1000" and insert -- 10% --, therefor.

In Column 10, Line 52, delete "50%0" and insert -- 50% --, therefor.

In Column 11, Line 7, table 12, delete "117.4" and insert -- 117.1 --, therefor.

In Column 13, Line 61, delete "150%" and insert -- 15% --, therefor.

In Column 13, Line 63, delete "150%" and insert -- 15% --, therefor.

Signed and Sealed this
Thirtieth Day of July, 2024

Katherine Kelly Vidal
*Director of the United States Patent and Trademark Office*